United States Patent
Smith

(10) Patent No.: US 10,713,743 B1
(45) Date of Patent: Jul. 14, 2020

(54) MANAGEMENT OF VISITATION SESSIONS FOR RESIDENTS OF CONTROLLED-ENVIRONMENT FACILITIES

(71) Applicant: Securus Technologies, Inc., Carrollton, TX (US)

(72) Inventor: Matthew R. Smith, McKinney, TX (US)

(73) Assignee: Securus Technologies, Inc., Carrollton, TX (US)

(*) Notice: Subject to any disclaimer, the term of this patent is extended or adjusted under 35 U.S.C. 154(b) by 92 days.

(21) Appl. No.: 15/986,511

(22) Filed: May 22, 2018

Related U.S. Application Data

(63) Continuation of application No. 14/070,227, filed on Nov. 1, 2013, now abandoned.

(51) Int. Cl.
| | |
|---|---|
| *G06Q 50/26* | (2012.01) |
| *H04W 4/30* | (2018.01) |
| *H04M 3/436* | (2006.01) |
| *H04M 3/42* | (2006.01) |
| *H04L 29/06* | (2006.01) |
| *G06Q 10/00* | (2012.01) |

(52) U.S. Cl.
CPC ............ *G06Q 50/26* (2013.01); *G06Q 10/00* (2013.01); *H04L 65/1076* (2013.01); *H04M 3/42348* (2013.01); *H04M 3/436* (2013.01); *H04W 4/30* (2018.02)

(58) Field of Classification Search
CPC .. G06Q 50/26; G06Q 10/109; G06Q 10/1093; G06Q 10/1095; H04L 65/1076; H04M 3/42348; H04M 3/436; H04M 4/04

USPC ............ 705/5, 7.12, 7.13, 7.15, 7.18, 7.22; 455/414.1

See application file for complete search history.

(56) References Cited

U.S. PATENT DOCUMENTS

| | | |
|---|---|---|
| 8,761,360 B1 | 6/2014 | Gongaware et al. |
| 2003/0099337 A1 | 5/2003 | Lord |
| 2003/0174826 A1 | 9/2003 | Hesse |
| 2004/0064567 A1 | 4/2004 | Doss et al. |
| 2004/0064585 A1 | 4/2004 | Doss et al. |
| 2005/0114192 A1 | 5/2005 | Tor et al. |
| 2005/0119927 A1 | 6/2005 | Patel |
| 2006/0087555 A1 | 4/2006 | Boyd et al. |
| 2006/0167725 A1 | 7/2006 | Grunspan et al. |
| 2006/0173723 A1 | 8/2006 | Fisher |
| 2007/0285504 A1* | 12/2007 | Hesse ............ H04N 7/15 348/14.08 |
| 2008/0000966 A1 | 1/2008 | Keiser |

(Continued)

*Primary Examiner* — King Y Poon
*Assistant Examiner* — Vincent Peren
(74) *Attorney, Agent, or Firm* — Fogarty LLP

(57) ABSTRACT

Systems and methods for implementing and using temporary movement buffers for residents of controlled-environment facilities are disclosed. In some embodiments, for example, a method may include determining that a resident of a controlled-environment facility is unable to access a communication device to be used during a communication event involving the resident. The method may also include performing at least one of: (a) allowing the communication event in response to a buffer value associated with the resident being smaller than a time to the communication event; or (b) declining the communication event in response to the buffer value associated with the resident being greater than the time to the communication event.

9 Claims, 4 Drawing Sheets

(56) References Cited

U.S. PATENT DOCUMENTS

| | | |
|---|---|---|
| 2008/0201158 A1 | 8/2008 | Johnson et al. |
| 2009/0119126 A1 | 5/2009 | Johnson et al. |
| 2010/0070327 A1 | 3/2010 | Chua et al. |
| 2010/0241483 A1 | 9/2010 | Haynes et al. |
| 2010/0253521 A1* | 10/2010 | Williams, Sr. ......... G06Q 10/06 340/572.1 |
| 2012/0173259 A1 | 7/2012 | Amberg et al. |
| 2012/0281058 A1 | 11/2012 | Laney et al. |
| 2013/0194377 A1 | 8/2013 | Humphries |
| 2013/0262521 A1 | 10/2013 | Gupta et al. |
| 2014/0192132 A1 | 7/2014 | Avery et al. |
| 2014/0266704 A1 | 9/2014 | Dailey, Jr. et al. |
| 2014/0267540 A1 | 9/2014 | Torgersrud |
| 2014/0282896 A1 | 9/2014 | Torgersrud et al. |
| 2014/0365257 A1 | 12/2014 | Goodnight et al. |

* cited by examiner

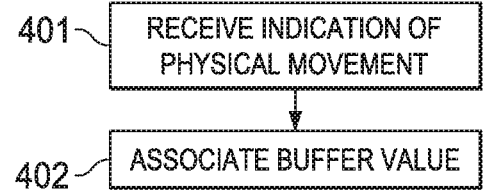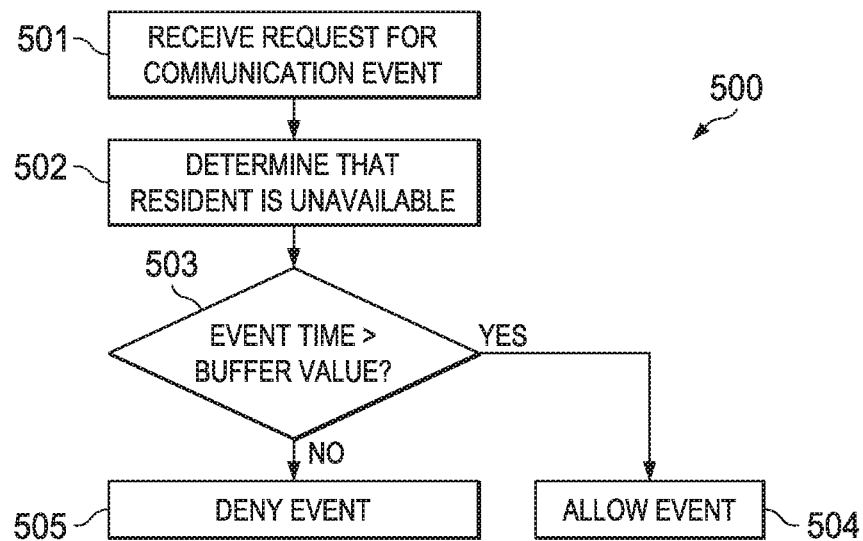

MANAGEMENT OF VISITATION SESSIONS FOR RESIDENTS OF CONTROLLED-ENVIRONMENT FACILITIES

CROSS REFERENCE TO RELATED APPLICATIONS

This patent application claims priority to, and is a continuation of, U.S. patent application Ser. No. 14/070,227 filed on Nov. 1, 2013 and also titled "Temporary Movement Buffer for Residents of Controlled-Environment Facilities" which is herein incorporated by reference.

TECHNICAL FIELD

This specification relates generally to controlled-environment facilities, and, more particularly, to systems and methods for implementing and using temporary movement buffers for residents of controlled-environment facilities.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including videoconferences and online chat sessions.

To enable these various types of communications, a jail or prison may install communication devices in different parts of the facility. Such communication devices are generally dedicated to provide inmate contact with the outside world. These devices are typically located in different areas throughout the facility. At the time of a scheduled visitation, an officer may physically move the inmate from his or her cell or to a communication device or station in a designated area within the correctional facility, where he or she may be able to conduct a remote visitation with friends, family, acquaintances, etc. When the communication is over, the officer may then escort the inmate back to his or her cell.

SUMMARY

Systems and methods for implementing and using temporary movement buffers for residents of controlled-environment facilities are described. In an illustrative, non-limiting embodiment, a method may include determining, via a computer system, that a resident of a controlled-environment facility is unable to access a communication device to be used during a communication event involving the resident, and performing at least one of: allowing the communication event in response to a buffer value associated with the resident being smaller than a time to the communication event; or declining the communication event in response to the buffer value associated with the resident being greater than the time to the communication event.

For example, the one or more residents may be inmates, and the controlled-environment facility may be a correctional facility. Also, the communication event may include at least one of: a telephone call, a video visitation session, an electronic chat session, or a video telephone call. In some implementations, determining that the resident is unable to access the communication device may include determining that the resident is at a location outside of the controlled-environment facility.

In some cases, the communication event may be an event yet to be scheduled, allowing the event may include scheduling the event, and declining the event may include not scheduling the event or proposing an alternative time for the event. Additionally or alternatively, the communication event may be an event already scheduled, allowing the event may include maintaining the scheduled event, and declining the event may include canceling or rescheduling the scheduled event.

In some embodiments, the method may include retrieving the buffer value stored in a database. For example, the buffer value may be configured as a function of the resident's location, the location selected from the group consisting of: a facility work area, a work release location, a school, a church, a courtroom, a hospital, and an infirmary. Additionally or alternatively, the buffer value may be configured as a function of an identity of the resident.

The method may also include canceling one or more communication events involving the resident, the one or more communication events scheduled to take place prior to the buffer value expiring. The method may further include, after having allowed the communication event, determining, at a predetermined time prior to the communication event, that the resident is still without access to the communication device, and canceling or rescheduling the communication event.

In another illustrative, non-limiting embodiment, a method may include receiving a request to schedule a visitation event involving an inmate of a correctional facility, determining that the inmate is not currently available to participate in the requested visitation event, and scheduling the visitation event in response to a time for the visitation event taking place after expiration of a buffer value associated with the inmate.

The visitation event may include an in-person visitation or a remote visitation session using a communication device, and the method may include determining that the inmate is at a location outside of the correctional facility. In some cases, the buffer value may be configurable as a function of the inmate's location, the location selected from the group consisting of: a work release location, a school, a church, a courtroom, a hospital, and an infirmary.

In yet another illustrative, non-limiting embodiment, a method may include receiving an indication that an inmate of a correctional facility is being physically moved to a particular location within or outside of the correctional facility, and associating a buffer value with an electronic inmate record, wherein the buffer value is a function of the particular location. The buffer value may be configurable as a function of the particular location, the particular location selected from the group consisting of: a facility work area, a work release location, a school, a church, a courtroom, a hospital, and an infirmary. In some cases, the configurable buffer value may be manually adjustable by facility personnel.

The method may also include receiving a request to schedule a communication event involving the inmate and allowing the communication event to be scheduled in response to the communication event taking place after expiration of the buffer value. Additionally or alternatively, the method may include receiving a request to schedule a communication event involving the inmate, and not allowing the communication event to be scheduled in response to the communication event taking place before expiration of the buffer value.

In some embodiments, one or more of the techniques described herein may be performed via one or more computer systems. In other embodiments, a tangible computer-readable storage medium may have program instructions stored thereon that, upon execution by one or more computer systems, cause the one or more computer systems to execute one or more operations disclosed herein. In yet other embodiments, a system may include at least one processor and a memory coupled to at least one processor. The memory may store program instructions executable by the at least one processor to execute one or more operations disclosed herein.

BRIEF DESCRIPTION OF THE DRAWINGS

Figure 1:
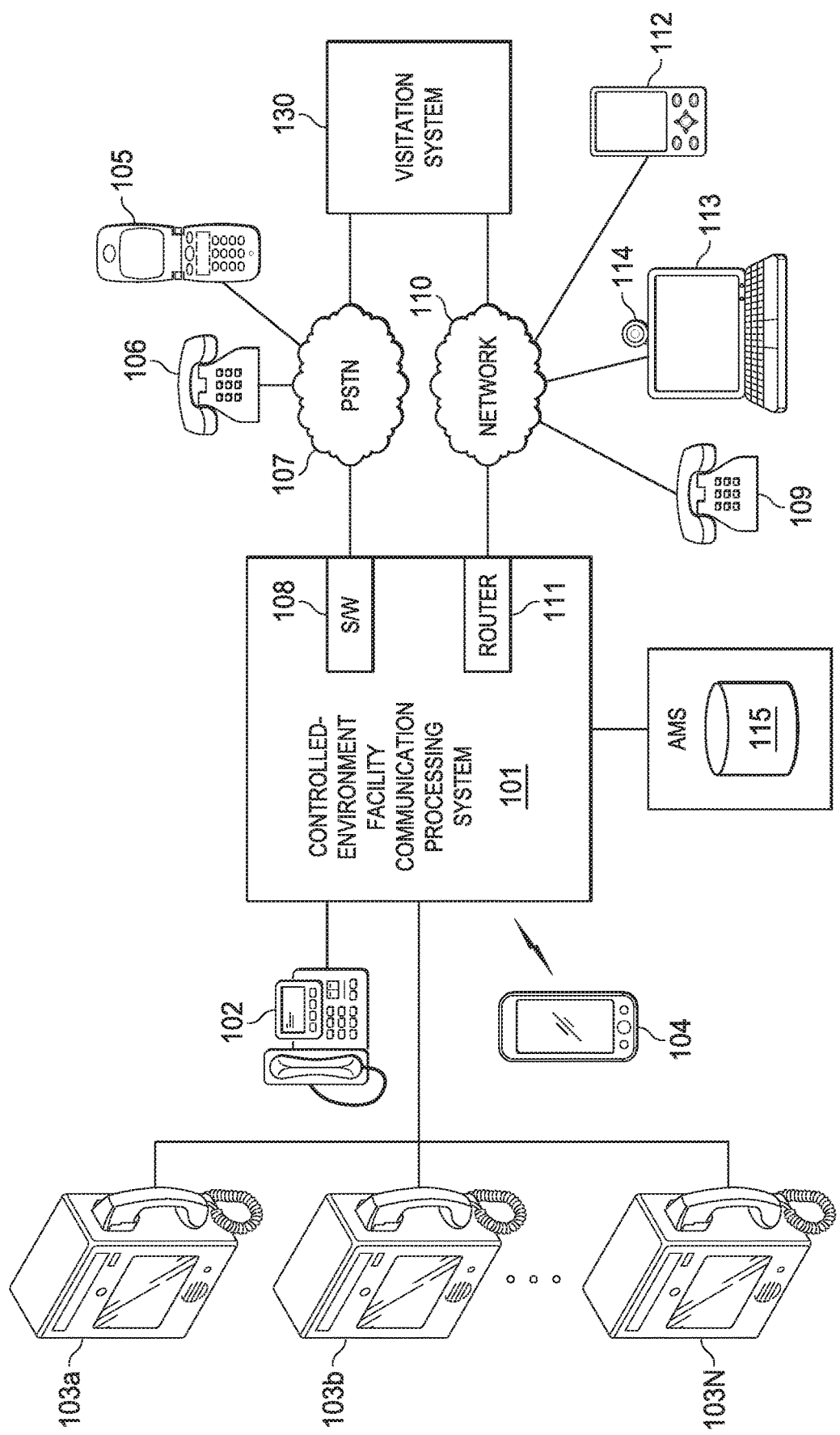

Having thus described the invention in general terms, reference will now be made to the accompanying drawings, which are not necessarily drawn to scale, and wherein:

FIG. 1 is a block diagram of an example of an environment where a visitation system may be employed according to some embodiments.

Figure 2:
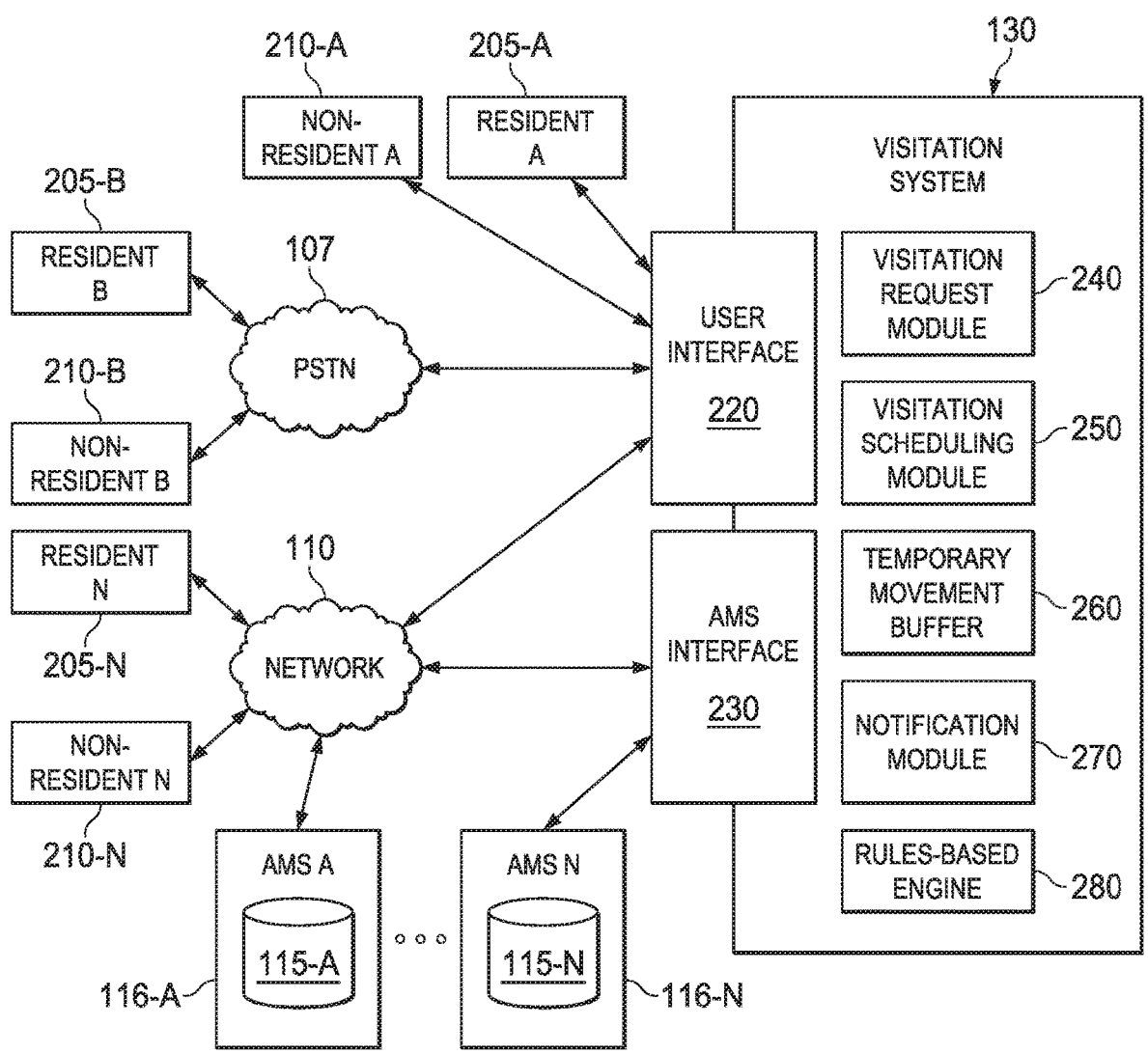

FIG. 2 is a diagram of an example of a video visitation system according to some embodiments.

Figure 3:
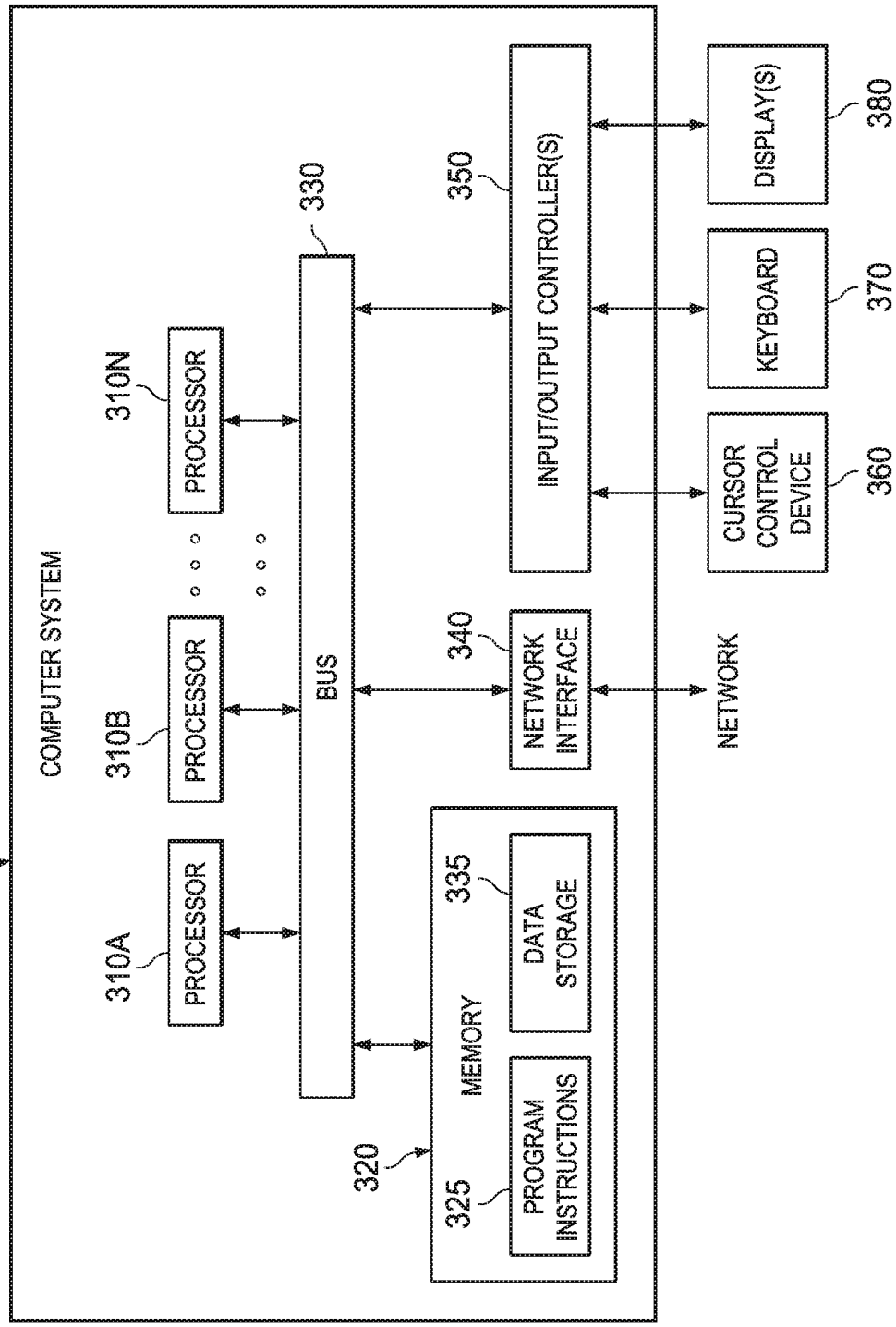

FIG. 3 is a block diagram of an example of a computer system configured to implement various systems and methods described herein according to some embodiments.

FIGS. 4 and 5 are flowcharts of examples of methods for temporary movement buffer for residents of controlled-environment facilities according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods for implementing and using temporary movement buffers for residents of controlled-environment facilities. Various types of controlled environment facilities are present in today's society, and persons may be voluntary or involuntary residents of such facilities, whether temporarily or permanently. Examples of controlled environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the implementations discussed below, a controlled environment facility may be referred to as a jail or prison, and its residents may be referred to as arrestees, detainees, or inmates.

The inventor hereof has recognized that correctional facilities present numerous difficulties in areas such as security, surveillance, financial transactions, communications, visitation, investigation, budgetary, etc.; which in turn make technological implementations uniquely challenging in those environments. In many cases, technologies that are used outside of correctional facilities are not immediately applicable to the correctional environment without significant changes and modifications. Moreover, correctional facilities may have specific needs that are not particularly relevant outside of those environments.

As such, some of the systems and methods described herein may be specifically tailored to address one or more of the aforementioned needs and challenges. It should be understood, however, that other systems and methods described herein may also be applicable to other types of controlled environment facilities and their respective residents (e.g., a hospital and its patients) and, in some cases, may be applicable to environments that are not controlled at all.

Turning now to FIG. 1, a block diagram of an illustrative environment where a visitation system may be employed is depicted according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a personal computer wireless device 104 to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102, 103, and/or 104.

Under the control of communication processing system 101, devices 102-104 may be capable of connecting to a non-resident's (i.e., a person not incarcerated or otherwise committed to a controlled-environment facility) device 105 or telephone 106 across a publicly switched telephone network (PSTN) 107. For example, device 105 may be a mobile phone, whereas telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109 or device 112.

Video visitation devices 103a-n (each collectively referred to as "video visitation device 103") may have video conferencing capabilities to enable inmates to participate in video visitation sessions with non-residents of the correctional facility via video call, secure online chat, etc. For example, a non-resident party may have a personal or laptop computer 113 with camera 114 (or a cell phone, tablet computer, etc.). Additionally or alternatively, device 112 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each video visitation device 103 may be disposed in a visitation room, in a pod, kiosk, etc.

In addition to providing certain visitation and communication operations, communication processing system 101 may attempt to ensure that a resident's calls, video conferences, online chats, etc. are performed only with non-residents whose identities, devices, email addresses, phone numbers, etc. are listed in that resident's Pre-Approved Contact (PAC) list. Each resident's PAC list may be stored, for example, in database 115 maintained by Administration and Management System (AMS) 116. In addition to PAC list(s), AMS 116 may also store resident profile data (RPD), as well as communication and/or visitation rules applicable to each resident.

As an example, in the context of a correctional facility, AMS 116 is referred to as a Jail Management System (JMS). Within the AMS or JMS 116, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more gateways, switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within system 101.

In some implementations, communication system 101 may be configured to perform video visitation monitoring operations configured to monitor and or record video visitations (e.g., as electronic video files). In scenarios where communication system 101 is located within the controlled-environment facility, it may have direct access to AMS or JMS 116. In other embodiments, however, communication system 101 may be located remotely with respect to the controlled-environment facility, and access to AMS or JMS 116 may be obtained via a computer network such as, for example, network 110.

In some embodiments, video visitation devices 103 may be implemented as a computer-based system. For example, each of video visitation devices 103 may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

During a video visitation session, video visitation devices 103 may be configured to capture a video image of an inmate to be transmitted to a non-resident using the camera, and to display a video image of the non-resident to the inmate using the display. Video visitation devices 103 may also be configured to capture an audio signal from the inmate to be transmitted to a non-resident using the mouthpiece portion of the handset, and to provide an audio signal from the non-resident to the inmate using the earpiece portion of the handset. Additionally or alternatively, audio received from the non-resident may be reproduced via a loudspeaker, and audio provided by the inmate may be captured via a microphone.

In some cases, video visitation devices 103 may assume the form of any computer, tablet computer, smart phone, etc., or any other consumer device or appliance with videoconferencing capabilities.

Referring to FIG. 2, a block diagram of system 130 for providing visitation services to residents of a controlled-environment facility is depicted according to some embodiments. As shown, visitation system 130 includes user interface 220 and AMS or JMS interface 230. In some embodiments, residents and/or non-residents of one or more controlled-environment facilities may access, interact with, or otherwise use visitation system 130 via user interface 220. For example, user interface 220 may be provided as a web interface, IVR interface, or the like.

In some scenarios, resident 205-A and/or non-resident 210-A may connect to visitation system 130 via user interface 220. For example, resident 205-A and/or non-resident 210-A may directly or indirectly (e.g., through an officer or personnel of the controlled-environment facility) reach a computer terminal or a telephone disposed within a controlled-environment facility and request visitation services. In other scenarios, resident 205-B and/or non-resident 210-B may interact with user interface 220 via PSTN 107 using an IVR system or the like. Additionally or alternatively, resident 205-N and/or non-resident 210-N may access a website, webpage, Internet portal, etc. via a computer network or Internet 110, for example, using a personal computing device (e.g., running a web browser), cell phone (e.g., via an "app"), prison terminal, or any other suitable client device.

When implemented to support web-based interactions, user interface 220 may be deployed using a number of suitable techniques. For example, user interface 220 may be implemented using Hypertext Markup Language (HTML), Common Gateway Interface (CGI), Javascript, PHP, Perl, C/C++, or any suitable combination of these or other commercial, open source and/or proprietary languages, frameworks or development environments for generating and distributing web-based information. Further, in some implementations, a request and response data may be exchanged between a client and visitation system 130 through the use of messages or documents formatted in eXtensible Markup Language (XML) or other platform-independent data format. For example, in some embodiments, a web services request to provide visitation services may be embodied in an XML document including fields identifying the person(s) that will be participating in the visitation, the type, time, and/or duration of the visitation, and possibly other fields, in which each field is delimited by an XML tag describing the type of data the field represents. In other implementations, web services-related documents may be transmitted between applications making requests and targeted web services using a web-based data transfer protocol, such as a version of the Hypertext Transfer Protocol (HTTP), for example.

In some embodiments, visitation system 130 may interact with one or more AMS or JMS systems 116A-N either directly or via a computer network such as the Internet 110. As previously noted, each AMS or JMS system 116A-N may each include its own database 115A-N, respectively. Generally speaking, databases 115A-N may include any suitable type of application or data structure that may be configured as a persistent data repository. For example, databases 115A-N may be configured as relational databases that include one or more tables of columns and rows and that may be searched or queried according to a query language, such SQL or the like. Alternatively, databases 115A-N may be configured as structured data stores that include records formatted according to a markup language, such as XML or the like. In other embodiments, databases 115A-N may be implemented using one or more arbitrarily or minimally structured files managed and accessible through a corresponding type of application.

In addition to interfaces 220 and 230, visitation system 130 includes visitation request module 240, visitation scheduling module 250, temporary movement buffer module 260, notification or communication module 270, and rules-based engine (or simply "engine" 280). Visitation request module 240 may be configured to receive one or more visitation scheduling requests, modification requests, or cancellation requests, for example, via user interface 220. Visitation scheduling module 250 may be configured to execute an incoming request, for example, by scheduling a new visitation, modifying a previously scheduled visitation, or canceling the previously scheduled visitation. Temporary movement buffer module 260 may be configured to identify and process visitation operations for inmates that have been physically moved from or within a controlled-environment facility. Module 260 may also include or otherwise have access to a database of buffer values for each moved inmate. Notification module 270 may be configured to notify a party of a particular visitation, modification, cancelation, etc.

Rules-based engine 280 may be configured to store a plurality of rules usable by one or more request module 240, visitation scheduling module 250, temporary movement buffer module 260, or notification module 270 during the course of their respective operations. For example, engine 280 may store one or more scheduling rules that allows (or prohibits) certain persons to perform a scheduling operation. Those rules may be applied to incoming visitation requests by visitation request module 240. Also, engine 280 may include other rules regarding notifications or temporary movement buffer operations that may be employed by notification module 270 or temporary movement buffer module 260, respectively. These, and other techniques, are illustrated in more detail below in connection with FIGS. 4 and 5.

In various embodiments, modules 220-280 shown in FIG. 2 may represent sets of software routines, logic functions, and/or data structures that are configured to perform operations described herein. Although these modules are shown as distinct logical blocks, in other embodiments at least some of the functionality provided by these modules may be combined into fewer blocks. Conversely, one or more of modules 220-280 may be implemented such that it is divided among two or more logical blocks. Moreover, although shown with a particular configuration, in other embodiments these various modules may be rearranged in other ways.

Also, in certain embodiments, each of the different components of visitation system 130 may be implemented in software, hardware or a suitable combination thereof, in an integrated fashion (e.g., on a single server or computer system) or in a distributed fashion (e.g., via a number of discrete systems configured to communicate with one another via a network). Additionally or alternatively, the operation of visitation system 130 may be partitioned into components in a different fashion than illustrated in FIG. 2.

Embodiments of systems and methods for temporary movement buffer for residents of controlled-environment facilities, as described herein, may be implemented or executed by one or more computer systems. One such computer system is illustrated in FIG. 3. In various embodiments, computer system 300 may be a server, a mainframe computer system, a workstation, a network computer, a desktop computer, a laptop, or the like. For example, in some cases, one or more of blocks 220-280 shown in FIG. 2 may be implemented as computer system 300. Moreover, one or more of communication devices 103, 104, and 113; communication system 101; and visitation system 130 may include one or more computers in the form of computer system 300. As explained above, in different embodiments these various computer systems may be configured to communicate with each other in any suitable way, such as, for example, via network 110.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360-380 may be capable of communicating with I/O controllers 350, for example, via a wired connection (e.g., serial port, Universal Serial Bus port) or wireless connection (e.g., Wi-Fi, Bluetooth, Near Field Communications Link, etc.) Other devices may include, for example, surveillance cameras, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as those described herein may be stored within system memory 320 as program instructions 325 and data storage 335, respectively. In other embodiments, program instructions and/or data may be received, sent or stored upon different types of computer-accessible media or on similar media separate from system memory 320 or computer system 300.

Generally speaking, a computer-accessible medium may include any tangible or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the device, including network interface 340 or other peripheral interfaces, such as input/output devices 350. In some embodiments, bus 330 may perform any necessary protocol, timing or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all of the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data may be accessible by program instructions 325. In an embodiment, program instructions 325 may include software elements of embodiments illustrated herein. For example, program instructions 325 may be implemented in various embodiments using any desired programming language, scripting language, or combination of programming languages and/or scripting languages (e.g., C, C++, C #, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Resident visitation (whether in-person or remote) and other communication events (e.g., telephone calls, video visitation sessions, electronic chat sessions, video telephone calls, etc.) are dependent upon the resident being available at a desired date and time. For example, a resident may have to be present at a given physical location(s) and/or have access to a communication device (e.g., devices 102-104) to be used in the communication at the time scheduled for a communication event.

In the case of correctional facilities, an inmate's physical location and availability information is maintained by AMS or JMS 116. For instance, each inmate may wear a Radio Frequency Identification (RFID) tag in the form or a bracelet, anklet, etc. Each inmate RFID tag may contain a unique identification number, and RFID readers may be disposed throughout the prison (e.g., work areas, pods, cells, recreation areas, cafeteria, infirmary, etc.) to keep track of the inmate's location within the facility. When an inmate temporarily leaves the prison (e.g., to participate in a work release program, to receive medical treatment at a hospital, to attend school, church, court, etc.), the inmate's RFID tag may be scanned upon exit and/or entry into the prison, transportation vehicle, etc. Additionally or alternatively, the inmates' physical location and availability information may be entered into AMS or JMS 116 manually by an escorting officer. As such, prison staff, correctional officers, or other facility personnel may keep track of the inmate's whereabouts by consulting the inmate's record in AMS or JMS 116.

Traditionally, if an inmate changes locations as indicated in AMS or JMS 116 such that a communication terminal is no longer available to that inmate, all of the inmate's upcoming communication or visitation events, regardless of time and date, are automatically cancelled. This becomes a problem when there is temporary inmate movement such as for work release or medical treatment. For example, if an inmate has a visitation event scheduled for Friday, but if he or she is moved to a temporary location where there are no visitation terminals on Tuesday, a conventional visitation system would have no way to know the duration of the temporary move, and therefore the Friday visit would be cancelled. This becomes an operational problem for controlled-environment facilities because visits and other communications are cancelled when they should not be.

To address these and other concerns, certain embodiments described herein allow a temporary movement buffer, configurable by location, where visits and other communication events are not canceled even if a resident is moved to a location from where there is no visitation terminal or communication device available. For example, an inmate is moved to a "medical location" as indicated in AMS or JMS 116, the inmate's electronic record may be provisioned with a temporary movement buffer having a value of, for instance, 24 hours. In that case, visits or other communication events that are scheduled to take place within 24 hours may be cancelled; however, visits that are scheduled for farther in the future (e.g., in 36 or 48 hours) may be maintained. Moreover, other locations (e.g., a "work release" location, etc.) may be configured with different buffer values (e.g., 8 hours).

FIGS. 4 and 5 are flowcharts of examples of methods for implementing and using temporary movement buffers for residents of controlled-environment facilities. In some embodiments, methods 400 and 500 may be performed, at least in part, by visitation system 130 and/or AMS/JMS 116 in conjunction with communication system 101.

Referring to FIG. 4, at block 401 method 400 may include receiving an indication of physical movement associated with a resident of a controlled-environment facility. For example, the inmate may be moved between different areas within the facility, or may be moved outside of the facility for a period of time. Such an indication may be received manually, for example, when facility personnel enter the inmate's movement information in AMS or JMS 116 using a computer terminal coupled to communications system 101. Additionally or alternatively, the indication of movement may be automatically captured via RFID or other wireless technology as the inmate gets within range of an RFID reader disposed within the prison, transportation vehicle, or the like. Once received, the indication of physical movement is associated with the particular resident and stored in an electronic resident record within database 115 of AMS or JMS 116.

At block 402, method 400 may include associating a temporary movement buffer value with the indication of physical movement. These associations may be configured, for instance, via rules-based engine 280 of visitation system 130, and the values themselves may be stored in a database within or otherwise accessible to temporary buffer module 260. For example, the indication of physical movement may provide that the resident has been moved to a particular work area, pod, cell, recreation area, cafeteria, infirmary, etc. within the facility. Additionally or alternatively, the indication of physical movement may provide that the resident has temporarily left the facility (e.g., to participate in a work release program, to receive medical treatment at a hospital, to attend school, church, court, etc.).

Each different location may be associated with a configurable temporary movement buffer value. For sake of illustration only, Table I below shows an example of a relationship between location and buffer value:

TABLE I

| Location | Temporary Movement Buffer Value (hr) |
|---|---|
| Work Area A | 2 |
| . . . | . . . |
| Work Area N | 4 |
| Cafeteria | 1 |
| Recreation Area | 0.5 |
| Infirmary | 1.5 |
| Work Release A | 4 |
| . . . | . . . |
| Work Release N | 8 |
| Church | 2 |
| Hospital | 24 |
| Court | 6 |
| . . . | . . . |

In the foregoing example, a number of "work areas" A-N within the facility may each be associated with a different buffer value; in this case, between 2 and 4 hours. Other locations within the facility with their own buffer values include the cafeteria (1 hour), a recreation area (half an hour), and an infirmary (1.5 hours). Moreover, each of a number of "work release" locations A-N outside of the facility is also associated with a different buffer value; in this case, between 4 and 8 hours. Additional locations include a church (2 hours), a hospital (24 hours), and a courtroom (6 hours). As will be understood by a person of ordinary skill in the art in light of this disclosure, any number of locations may be set up, and each location may have any suitable buffer value associated therewith.

In some implementations, the aforementioned buffer values may also be a function of the identity of the resident. For example, a standard buffer value for inmates visiting a hospital may be 24 hours, but for a particular inmate undergoing a known treatment, for example, the buffer value may be more or less than the standard value. This resident-based adjustment to buffer values may be provided in addition or as an alternative to the location-based values. In some cases, the resident-based adjustment may be entered manually by facility personnel, and in other cases it may be an automatic value or multiplicative factor stored in the resident's record within AMS/JMS 116. Still referring to the same example, if an inmate checks in at an outside hospital for a first procedure and while at the hospital it is discovered that the resident needs to undergo a second procedure, prison staff may alter the buffer value associated with that inmate to reflect his or her extended absence from the prison.

Referring now to FIG. 5, method 500 may include receiving a request for a communication event involving a resident such as, for instance, a telephone call, a video visitation session, an electronic chat session, or a video telephone call. Generally, the request may be originated by the resident, by a non-resident, or by the facility's administration. In some cases, the request may be received at visitation request module 240 of visitation system 130. In other cases, the request may in fact be an existing, already scheduled visitation.

At block 502, method 500 may include determining that the resident involved in the communication event is currently not available. For example, block 502 may determine that the resident is unable to access a communication device to be used during the event and/or that the resident is at a location outside of the controlled-environment facility. In some cases, one or more operations of block 502 may be performed by temporary movement buffer module 260 and/or by AMS/JMS 116. Particularly, the resident's location and availability information may be passed to visitation system 130 through integration with the facility's AMS or JMS 116.

At block 503, method 500 may include determining whether the date and/or time of the communication event occurs later than what a temporary movement buffer value associated with the resident provides. If so, then at block 504 method 500 may include allowing or accepting the request for the communication event. Otherwise, at block 505, method 500 may include declining the request for the communication event. In some cases, declining the event may include not scheduling the event and/or proposing an alternative date or time for the event.

In some implementations, rather than being triggered by the receipt of a request for a communication event in block 501, method 500 may be performed periodically and/or may be triggered by the movement of the resident and/or by a change in the resident's temporary movement buffer value. For example, when an inmate moves between different locations within or outside of a prison, method 500 may determine that the inmate is unavailable and may compare the time of events that have already been scheduled—that is, existing visits—with the buffer value associated with that inmate. In those cases, block 505 may include canceling one or more communication events involving the resident if the one or more communication events are scheduled to take place prior to the buffer value expiring. Conversely, events scheduled to take place after the buffer value expires may be maintained.

The various systems and methods illustrated in the figures and described herein represent example embodiments of systems and methods for implementing and using temporary movement buffers for residents of controlled-environment facilities. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A controlled-environment facility resident management system comprising:

a resident communication system comprising a plurality of resident communication terminals located within the controlled-environment facility;

a network of RFID (Radio Frequency Identification) readers installed at a plurality of locations within the controlled-environment facility, wherein the RFID readers are configured to detect RFID tags worn by a plurality of residents of the controlled-environment facility;

a management system configured to track changes in the locations of the plurality of residents within the controlled-environment facility based on the RFID tags detected by the network of RFID readers;

a schedule system for managing use of the resident communication terminals by the plurality of residents in visitation sessions, the schedule system configured to:

cancel a scheduled use of the resident visitation terminals for a visitation session by a resident based on a change in location of the resident to a first location that is tracked by the management system based on the detected RFID tags;

determine if the first location provides access to one or more resident communication terminals;

if the first location does not provide access to a resident communication terminal, determine a buffer value associated with the first location, wherein the buffer value specifies a duration indicating the resident's expected time at the first location before returning to a controlled-environment facility location where one or more of the plurality of resident communication terminals are available to the resident; and delay canceling the visitation session for a time period that corresponds to the duration specified by the buffer value.

2. The controlled-environment facility resident management system of claim 1, wherein the first location of the resident is a location indicating a temporary movement of the resident within the controlled-environment facility.

3. The controlled-environment facility resident management system of claim 1, wherein the first location of the resident is a location indicating an extended period outside of the controlled-environment facility by the resident.

4. A method implemented in a controlled-environment facility resident management system comprising a plurality of resident communication terminals located within the controlled-environment facility, and further comprising a network of RFID (Radio Frequency Identification) readers installed at a plurality of locations within the controlled-environment facility, the method comprising:

detecting, by the RFID readers, RFID tags worn by a plurality of residents of the controlled-environment facility;

tracking changes in the locations of the plurality of residents within the controlled-environment facility based on the RFID tags detected by the network of RFID readers;

managing use of the resident communication terminals by the residents in visitation sessions;

canceling a scheduled use of the resident visitation terminals for a visitation session by a resident of the plurality of residents, based on a change in the location of the resident to a first location that is tracked based on the detected RFID tags;

determining if the first location provides access to one or more resident communication terminals;

if the first location does not provide access to a resident communication terminal, determining a buffer value associated with the first location, wherein the buffer value specifies a duration indicating the resident's expected time at the first location before returning to a controlled-environment facility location where one or more of the plurality of resident communication terminals are available to the resident; and delaying canceling of the visitation session for a time period that corresponds to the duration specified by the buffer value.

5. The method of claim 4, wherein the first location of the resident is a location indicating a temporary movement by the resident within the controlled-environment facility.

6. The method of claim 4, wherein the first location of the resident is a location indicating an extended period outside of the controlled-environment facility by the resident.

7. A computer-readable storage device having program instructions stored thereon for managing communication services by residents of a controlled-environment facility, wherein upon execution by one or more processors, the program instructions cause the one or more processors to:

receive, from network RFID (Radio Frequency Identification) readers installed at a plurality of locations within the controlled-environment facility, notification of detected RFID tags worn by a plurality of residents of the controlled-environment facility;

track changes in the locations of the plurality of residents within the controlled-environment facility based on the RFID tags detected by the network of RFID readers;

manage use of the resident communication terminals located within the controlled-environment facility by the plurality of residents in visitation sessions;

cancel a scheduled use of the resident visitation terminals for a visitation session by a resident of the plurality of residents, based on a change in the location of the resident that is tracked based on the detected RFID tags;

determine if the first location provides the resident with access to any resident communication terminals;

if the first location does not provide access to any resident communication terminals, determine a buffer value associated with the first location, wherein the buffer value specifies a duration indicating the resident's expected time at the first location before returning to a controlled-environment facility location where one or more of the plurality of resident communication terminals are available to the resident; and delay canceling of the visitation session for a time period that corresponds to the duration specified by the buffer value.

8. The computer-readable storage device of claim 7, wherein the first location of the resident is a location indicating a temporary movement of the resident within the controlled-environment facility.

9. The computer-readable storage device of claim 7, wherein the first location of the resident is a location indicating an extended period outside of the controlled-environment facility by the resident.

\* \* \* \* \*